(12) United States Patent  (10) Patent No.: US 8,649,822 B2
Chen et al.  (45) Date of Patent: Feb. 11, 2014

(54) SECURE DIGITAL CARD

(75) Inventors: Bin Chen, Shaanxi (CN); Xia Liu, Shanghai (CN); Jin-Hua Cao, Tongzhou (CN); Ze-Kang Jin, Shanghai (CN)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 108 days.

(21) Appl. No.: 13/535,288

(22) Filed: Jun. 27, 2012

(65) Prior Publication Data

US 2013/0203466 A1  Aug. 8, 2013

(30) Foreign Application Priority Data

Feb. 7, 2012  (CN) .......................... 2012 1 0026386

(51) Int. Cl.
H04B 1/38  (2006.01)
(52) U.S. Cl.
USPC ......................................... 455/558; 455/41.1
(58) Field of Classification Search
USPC ................... 455/558, 41.1, 41.2, 556.1, 557; 235/375, 380, 487; 705/64, 65
See application file for complete search history.

(56) References Cited

U.S. PATENT DOCUMENTS

| | | | |
|---|---|---|---|
| 7,748,636 B2 * | 7/2010 | Finn | 235/492 |
| 8,196,131 B1 * | 6/2012 | von Behren et al. | 717/168 |
| 8,538,332 B2 * | 9/2013 | Huomo et al. | 455/41.2 |
| 2007/0145152 A1 * | 6/2007 | Jogand-Coulomb et al. | 235/492 |
| 2009/0312011 A1 * | 12/2009 | Huomo et al. | 455/426.1 |
| 2010/0009627 A1 * | 1/2010 | Huomo | 455/41.1 |
| 2010/0181377 A1 * | 7/2010 | Chen et al. | 235/440 |
| 2013/0238910 A1 * | 9/2013 | Liu et al. | 713/300 |

* cited by examiner

*Primary Examiner* — Sonny Trinh
(74) *Attorney, Agent, or Firm* — McClure, Qualey & Rodack, LLP

(57) ABSTRACT

The invention provides a secure digital card. In one embodiment, the secure digital card is coupled to a cell phone, and comprises a smart card, a secure digital card controller (SDC), a first power control circuit, and a second power control circuit. When the cell phone wants to perform a near-end payment process, the SDC controls the first power control circuit to supply a first voltage generated by a first power supply pin of a near field communication (NFC) controller to a power receive pin of the smart card. When the cell phone wants to perform a far-end payment process, the SDC controls a second power control circuit to supply a second voltage generated by a second power supply pin of the SDC to the power receive pin of the smart card.

18 Claims, 4 Drawing Sheets

SECURE DIGITAL CARD

CROSS REFERENCE TO RELATED APPLICATIONS

This application claims priority of China Patent Application No. 201210026386.4, filed on Feb. 7, 2012, the entirety of which is incorporated by reference herein.

BACKGROUND OF THE INVENTION

1. Field of the Invention

The invention relates to secure digital cards, and more particularly to bank-connection payments using the secure digital cards.

2. Description of the Related Art

An ordinary cell phone can perform a bank-connection payment with a secure digital card. Ordinarily, bank-connection payment processes are divided into near-end payment processes and far-end payment processes. When the user of a cell phone performs a near-end payment process, a near field communication (NFC) controller of the cell phone completes a financial transaction between the cell phone and a point of sale (POS) according to a near field communication protocol. When the user of the cell phone performs a far-end payment process, a payment application of the cell phone is used to complete a bank-connection payment.

No matter whether the user of the cell phone performs the near-end payment process or the far-end payment process, the cell phone needs to perform a bank-connection payment transaction with a secure digital card. Ordinarily, the secure digital card comprises a smart card for storing data about the bank-connection payment transaction. Because the smart card has data encryption capability and data processing capability, the smart card is suitable for storing bank-connection payment data. When the user of the cell phone performs a near-end payment process, an NFC controller of the cell phone supplies power to the smart card. When the user of the cell phone performs a far-end payment process, a secure digital card controller (SDC) supplies power to the smart card. Thus, the secure digital card must switch the power supplied to the smart card according to whether the user of the cell phone performs the far-end payment process or the near-end payment process.

Ordinarily, the NFC controller generates a voltage level of 3V or 1.8V to be supplied to the smart card, and the SDC generates a voltage level of 3.3 V to be supplied to the smart card. Because the voltage of 3.3V generated by the SDC is higher than the voltage of 3V or 1.8V generated by the NFC controller of the cell phone, when the SDC switches the power source of the smart card, the SDC must prevent the voltage of 3.3V generated by the SDC from surging to the NFC controller of the cell phone. Otherwise, the NFC controller of the cell phone may be damaged. Thus, a new type of secure digital card is required.

BRIEF SUMMARY OF THE INVENTION

The invention provides a secure digital card. In one embodiment, the secure digital card is coupled to a cell phone, and comprises a smart card, a secure digital card controller (SDC), a first power control circuit, and a second power control circuit. The smart card is coupled to a near field communication (NFC) controller via a single wire protocol (SWC) interface and comprises a power receive pin. The secure digital card controller is coupled to the cell phone via a standard input output (SDIO) interface, and is coupled to the smart card via an ISO-7816 interface. The first power control circuit is coupled between a first power supply pin of the NFC controller and the power receive pin of the smart card. The second power control circuit is coupled between a second power receive pin of the SDC and the power receive pin of the smart card. When the cell phone wants to perform a near-end payment process, the SDC controls the first power control circuit to supply a first voltage generated by the first power supply pin of the NFC controller to the power receive pin of the smart card. When the cell phone wants to perform a far-end payment process, the SDC controls second power control circuit to supply a second voltage generated by the second power supply pin of the SDC to the power receive pin of the smart card.

The invention provides a secure digital card. In one embodiment, the secure digital card is coupled to a cell phone, and comprises a smart card, a secure digital card controller (SDC), a first transistor, a second transistor, a first diode, and a resistor. The smart card is coupled to a near field communication (NFC) controller via a single wire protocol (SWC) interface, and comprises a power receive pin. The secure digital card controller is coupled to the cell phone via a standard input output (SDIO) interface, and is coupled to the smart card via an ISO-7816 interface. The first transistor is coupled between a first node and the power receive pin of the smart card, and has a gate coupled to a second node. The second transistor is coupled between the first node and a first power supply pin of the NFC controller, and has a gate coupled to the second node, wherein the direction of the parasitic diode of the first transistor is inverse to that of the parasitic diode of the second transistor. The first diode is coupled between the second node and a first input/output pin of the SDC. The resistor is coupled between the first power supply pin of the NFC controller and the second node.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
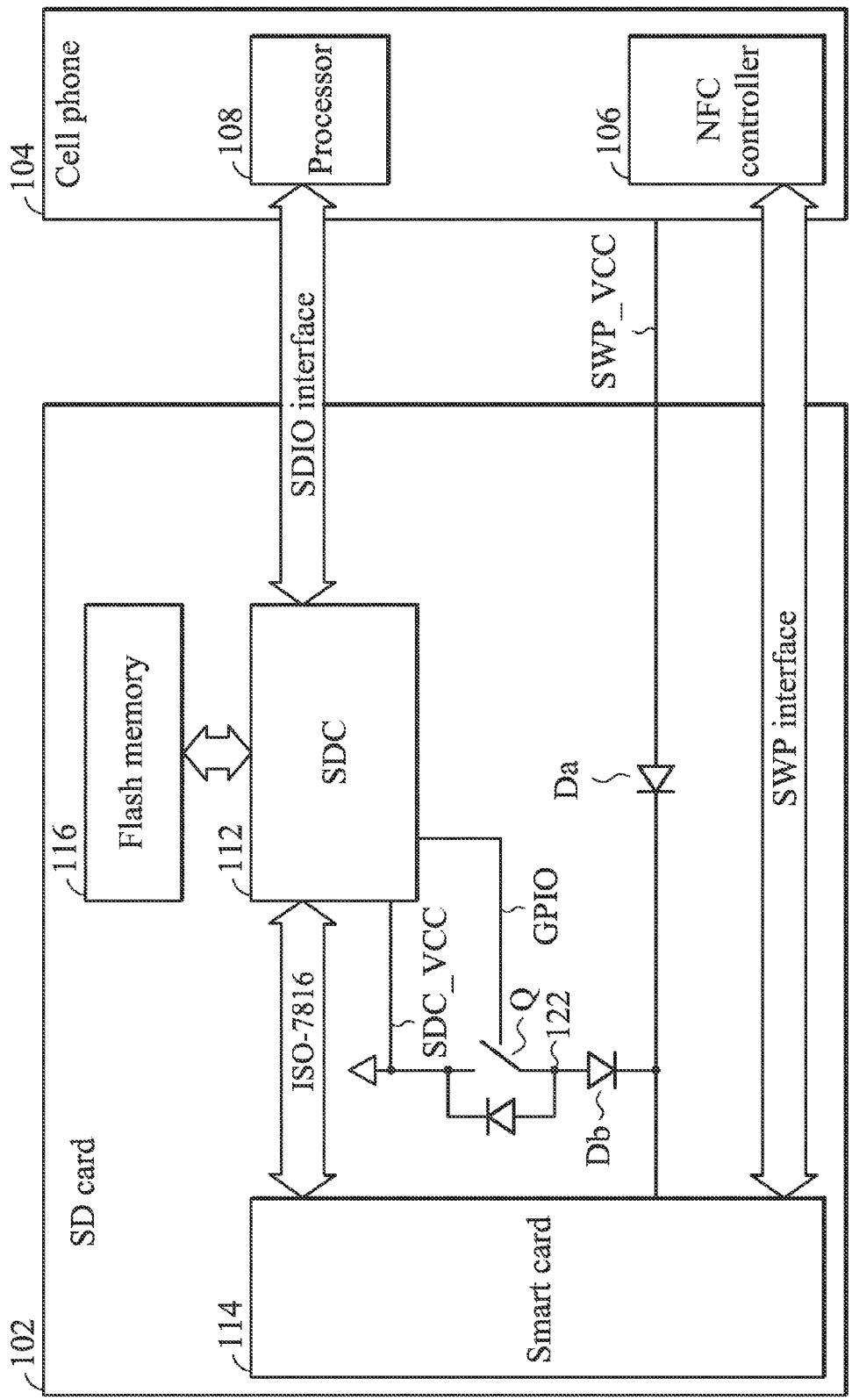
FIG. 1 is a block diagram of a first embodiment of a secure digital card according to the invention.

Referring to FIG. 1, a block diagram of an embodiment of a secure digital card 102 according to the invention is shown. The secure digital card 102 is coupled to a cell phone 104. In one embodiment, the secure digital card 102 comprises a secure digital card controller (SDC) 112, a smart card 114, a flash memory 115, diodes Da and Db, and a transistor Q. The cell phone 104 comprises a near field communication (NFC) controller 106 and a processor 108. The SDC 112 is coupled to the processor 108 of the cell phones 104 via a standard input/output (SDIO) interface, and is coupled to the smart card 114 via an ISO-7816 interface. The smart card 114 is coupled to the NFC controller 106 of the cell phone 104 via a single wire protocol (SWP) interface. The diode Da is coupled between a power supply pin SWP_VCC of the NFC controller 106 and a power receive pin 120 of the smart card 114. The diode Db is coupled between the node 122 and a power receive pin 120 of the smart card 113. The transistor Q is coupled between a power supply pin SDC_VDD of the SDC 112 and a node 122, and has a gate coupled to an input/output pin GPIO of the SDC 112.

A user of the cell phone 104 may performs a near-end payment process or a far-end payment process for completing a bank connection payment transaction. When the user of the cell phone 104 performs the near-end payment process, the SDC 112 turns off the transistor Q via the input/output pin GPIO, the voltage SDC_VCC generated by the power supply pin of the SDC 112 cannot be supplied to the smart card, and the voltage SWP_VCC generated by the power supply pin of the NFC controller 106 is supplied to the power receive pin 120 of the smart card 114 via the diode Da. The NFC controller 106 then performs a data exchange between the cell phone 104 and the smart card 114 via the SWP interface to complete the bank connection payment. When the user of the cell phone 104 performs a far-end payment process, the cell phone 104 supplies power to the SDC 112 via the SDIO interface. The SDC 112 turns on the transistor Q via the input/output pin GPIO, and the voltage SDC_VCC generated by the power supply pin of the SDC 112 is supplied to the power receive pin 120 of the smart card 114 via the transistor Q and the diode Db. The SDC 112 then performs a data exchange between the SDC 112 and the smart card 114 via the ISO-7816 interface to complete the bank connection payment.

The power supply of the smart card 114 of the secure digital card 102, however, has the following unsolved problems: First, the smart card 114 can only receive a supplied voltage level of 3V. When the NFC controller 106 generates a voltage SWP_VCC of 1.8V, the voltage passing through the diode Da becomes 1.5V, and the smart card 114 can not normally operate according to the 1.5V voltage. In addition, the SDC 112 generates a voltage SDC_VCC of 3.3V, the voltage passing through the diode Db becomes 3.2V, and the 3.2V voltage is higher than the voltage SWP_VCC (3V) generated by the NFC controller 106. When the SDC 112 supplies the voltage SDC_VCC to the smart card 114, the NFC controller 106 cannot supply power to the smart card 114, and also cannot perform a data exchange between the smart card 114 and the NFC controller 106. If the diode Db is removed from the secure digital card 102 when the voltage SWP_VCC generated by the NFC controller 106 is 1.8V, the voltage SDC_VCC (3.3V) generated by the SDC 112 will surge to the NFC controller 106 and cause damage to the NFC controller 106. In addition, when the SDC 112 does not generate the voltage SDC_VCC, and the NFC controller 106 generates the voltage SWP_VCC, because the transistor Q comprises a parasitic diode, the parasitic diode forms a current leakage path and extends the standby time period of the cell phone 104.

Figure 2:
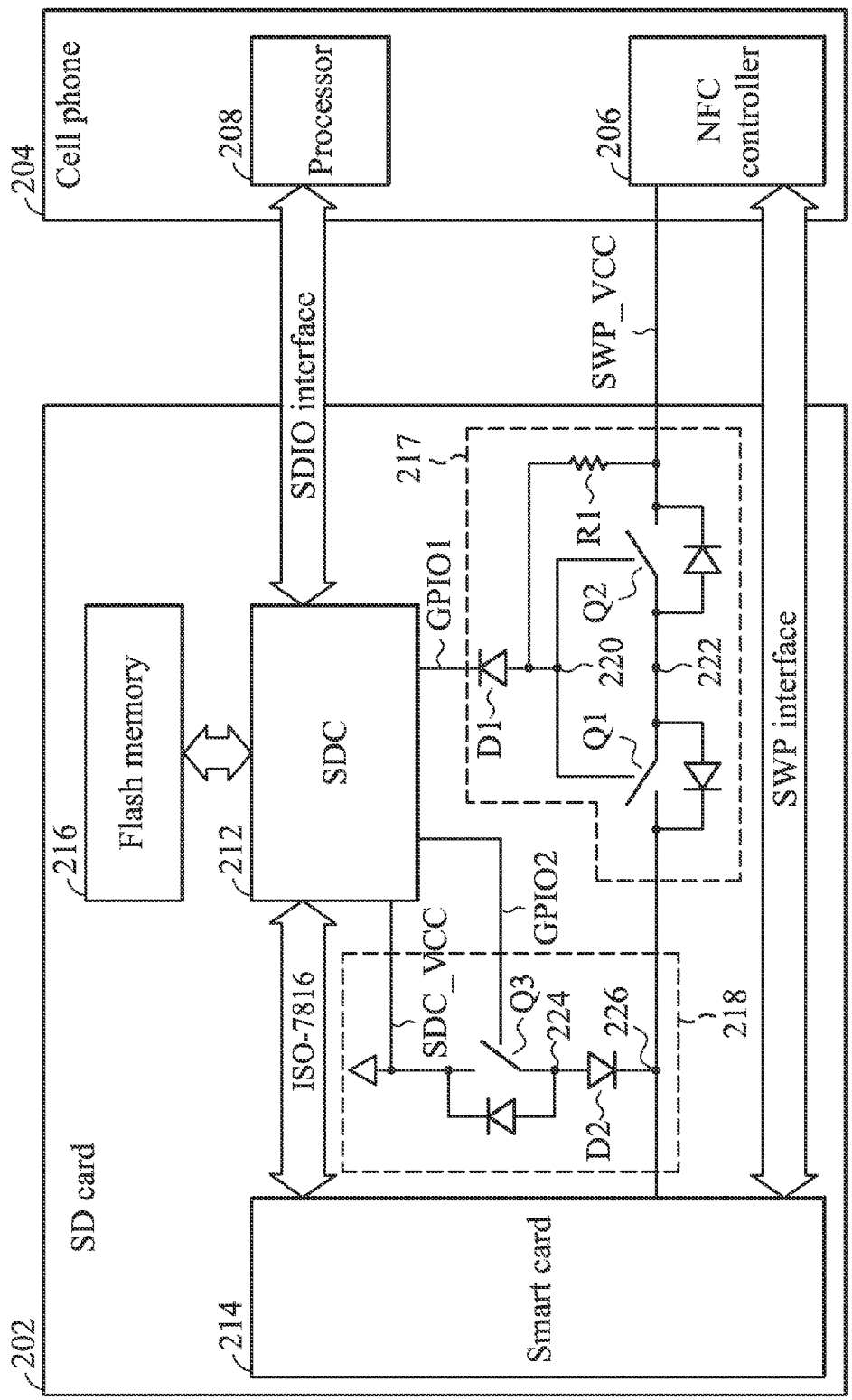
FIG. 2 is a block diagram of a second embodiment of a secure digital card according to the invention.

Referring to FIG. 2, a block diagram of an embodiment of a secure digital card 202 according to the invention is shown. In one embodiment, the secure digital card 202 comprises a secure digital card controller 212, a smart card 214, a flash memory 216, a first power control circuit 217, and a second power control circuit 218. The cell phone 104 comprises a near field communication (NFC) controller 206 and a processor 208. The SDC 212 is coupled to the processor 208 of the cell phone 204 via a standard input/output (SDIO) interface. The smart card 214 is coupled to the NFC controller 206 of the cell phone 204 via a single wire protocol (SWP) interface. The first power control circuit 217 is coupled between a power supply pin SWP_VCC of the NFC controller 206 and a power receive pin 226 of the smart card 214. The second power control circuit 218 is coupled between a power supply pin SDC_VCC of the SDC 212 and the power receive pin 226 of the smart card 214. The flash memory 216 is coupled to the SDC 212 and stores data for the SDC 212.

In one embodiment, the first power control circuit 217 comprises a diode D1, a resistor R1, a transistor Q1, and a transistor Q2. The transistor Q1 is coupled between a node 222 and a power receive pin 226 of the smart card 214, and has a gate coupled to the node 220. The transistor Q2 is coupled between the node 222 and the power supply pin SWP_VCC of the NFC controller 206, and has a gate coupled to the node 220. The parasite diode of the transistor Q1 has a direction inverse to that of the parasite diode of the transistor Q2. The diode D1 is coupled between the node 220 and an input/output pin GPIO1 of the SDC 212. The resistor R1 is coupled between the node 220 and the power supply pin SWP_VCC of the NFC controller 206. In one embodiment, the second power control circuit 218 comprises a diode D2 and a transistor Q3. The diode D2 is coupled between the node 224 and the power receive pin 226 of the smart card 214. The transistor Q3 is coupled between the power supply pin SDC_VCC of the SDC 212 and the node 224, and has a gate coupled to the input/output pin GPIO2 of the SDC 212.

The user of the cell phone 204 can perform a near-end payment process or a far-end payment process to complete a bank-connection payment transaction. When the user of the cell phone 204 performs the near-end payment process, the SDC 212 generates a low voltage on the input/output pin GPIO2 to turn off the transistor Q3, and the voltage SDC_VCC generated by the power supply pin of the SDC 212 cannot be supplied to the smart card 214. In addition, the SDC 212 generates a high voltage on the input/output pin GPIO1 to turn on the transistors Q1 and Q2, and the voltage SWP_VCC generated by the power supply pin of the NFC controller 206 is supplied to the power receive pin 226 of the smart card 214 via the transistors Q1 and Q2. The NFC controller 206 then completes a financial transaction between the cell phone 204 and a point of sale (POS) according to a near field communication (NFC) protocol, and performs a data exchange between the smart card 214 and the cell phone 204 according to the SWP protocol to complete the bank connection payment.

When the user of the cell phone 204 performs the far-end payment process, the cell phone 204 supplies power to the SDC 212 via the SDIO interface. The SDC 212 generates a low voltage on the input/output pin GPIO1 to turn off the transistors Q1 and Q2, and the voltage SWP_VCC generated by the power supply pin of the NFC controller 206 therefore cannot be supplied to the smart card 214. In addition, the SDC 212 generates a high voltage on the input/output pin GPIO2 to turn on the transistor Q3, and the voltage SDC_VCC generated by the power supply pin of the SDC 212 is supplied to the power receive pin 226 of the smart card 214 via the transistor Q3 and the diode D2. The SDC 212 and the cell phone 204 then complete a data exchange between the SDC 212 and the cell phone 204 according to a CupMobile protocol, and perform a data exchange between the SDC 212 and the smart card 215 via the ISO-7816 interface to complete the bank connection payment.

Figure 3:
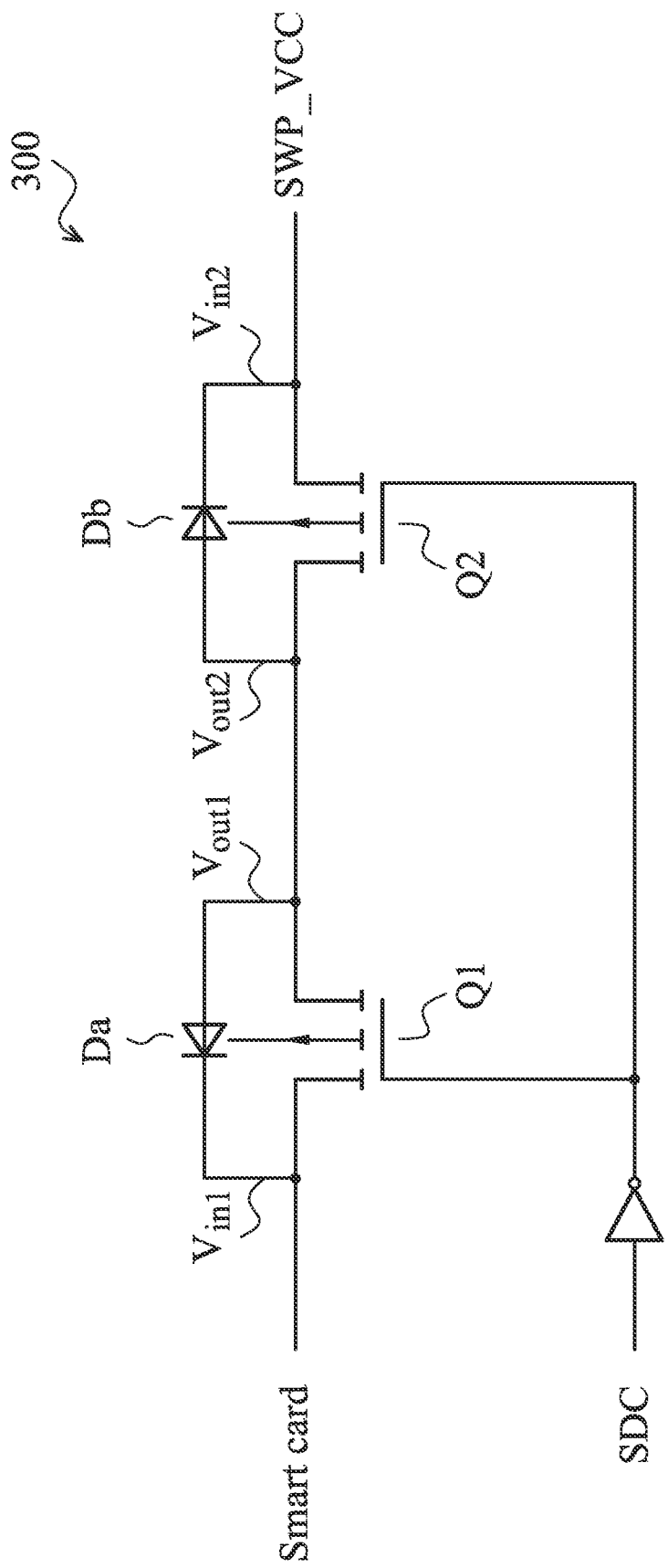
FIG. 3 is a schematic diagram of transistors Q1 and Q2 coupled between a power supply pin of an NFC controller and a power receive pin of a smart card according to the invention.

Referring to FIG. 3, a schematic diagram of transistors Q1 and Q2 coupled between a power supply pin of the NFC controller 206 and a power receive pin of the smart card 214 according to the invention is shown. An input terminal $V_{in1}$ of the transistor Q1 is coupled to the power receive pin of the smart card, an output terminal $V_{out1}$ of the transistor Q1 is coupled to the output terminal $V_{out2}$ of the transistor Q2, and a gate of the transistor Q1 is coupled to input/output pin of the SDC. An input terminal $V_{in2}$ of the transistor Q2 is coupled to the power supply pin SWP_VCC of the NFC controller, an output terminal $V_{out2}$ of the transistor Q2 is coupled to the output terminal $V_{out1}$ of the transistor Q1, and a gate of the transistor Q2 is coupled to an input/output pin of the SDC. The parasitic diode Da of the transistor Q1 has a direction inverse to that of the parasitic diode Db of the transistor Q2. When the transistors Q1 and Q2 are turned off, the voltage SWP_VCC generated by the NFC controller cannot be supplied to the power receive pin of the smart card. In addition, when the transistors Q1 and Q2 are turned on, the resistance of the transistors Q1 and Q2 is equal to 100~200 mΩ, and the current passing through the transistors Q1 and Q2 is equal to 100 mA, and the voltage drop across the transistors Q1 and Q2 is equal to 4 mV.

Figure 4:
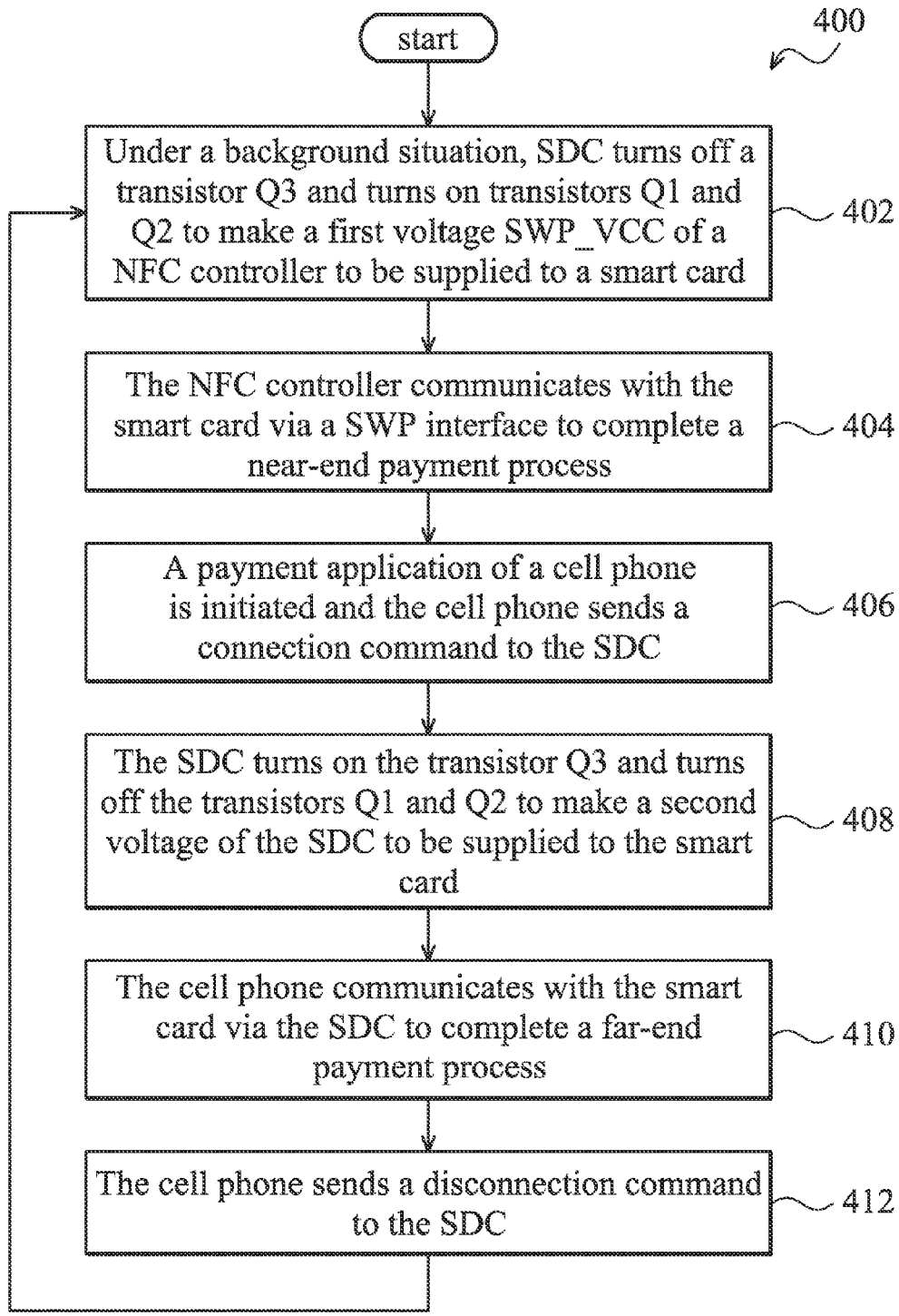
FIG. 4 is a flowchart of a method for switching a selected process between a near-end payment process and a far-end payment process according to the invention.

Referring to FIG. 4, a flowchart of a method 400 for switching a selected process between a near-end payment process and a far-end payment process according to the invention is shown. Assume that under a background situation, the near-end payment process is a predetermined process. The SDC 212 then turns off the transistor Q3 and turns on the transistors Q1 and Q2 to supply a first voltage SWP_VCC generated by the NFC controller 206 to the smart card 214 (step 402). The NFC controller 206 then performs a data exchange between the smart card 214 and the NFC controller 206 via a SWP interface to complete a near-end payment process (step 404). Assume that the user of the cell phone 204 then switches the selected process from the near-end payment method to the far-end payment process. A payment application of the cell phone 204 is then initiated, and the cell phone 204 sends a connection command to the SDC 212 (step 406). The SDC 212 then turns on the transistor Q3 and turns off the transistors Q1 and Q2 to supply a second voltage SDC_VCC generated by the SDC 212 to the smart card 214 (step 408). The cell phone 204 then performs a data exchange between the cell phone 204 and the smart card 214 to complete the far-end payment process (step 410). Finally, the cell phone 204 sends a disconnection command to the SDC 212 to switch the selected process back to the near-end payment process (step 412).

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A secure digital card, coupled to a cell phone, comprising:
   a smart card, coupled to a near field communication (NFC) controller via a single wire protocol (SWC) interface, comprising a power receive pin;
   a secure digital card controller (SDC), coupled to the cell phone via a standard input output (SDIO) interface, and coupled to the smart card via an ISO-7816 interface;
   a first power control circuit, coupled between a first power supply pin of the NFC controller and the power receive pin of the smart card; and
   a second power control circuit, coupled between a second power receive pin of the SDC and the power receive pin of the smart card;
   wherein when the cell phone wants to perform a near-end payment process, the SDC controls the first power control circuit to supply a first voltage generated by the first power supply pin of the NFC controller to the power receive pin of the smart card; and when the cell phone wants to perform a far-end payment process, the SDC controls the second power control circuit to supply a second voltage generated by the second power supply pin of the SDC to the power receive pin of the smart card.

2. The secure digital card as claimed in claim 1, wherein the first power control circuit comprises:
   a first transistor, coupled between a first node and the power receive pin of the smart card, having a gate coupled to a second node;
   a second transistor, coupled between the first node and the first power supply pin of the NFC controller, having a gate coupled to the second node, wherein the direction of the parasitic diode of the first transistor is inverse to that of the parasitic diode of the second transistor;
   a first diode, coupled between the second node and a first input/output pin of the SDC; and
   a resistor, coupled between the first power supply pin of the NFC controller and the second node.

3. The secure digital card as claimed in claim 2, wherein the second power control circuit comprises:
   a third transistor, coupled between the second power supply pin of the SDC and a third node, having a gate coupled to a second input/output pin of the SDC;
   a second diode, coupled between the third node and the power receive pin of the smart card;
   wherein the direction of the second diode is inverse to that of the parasitic diode of the third transistor.

4. The secure digital card as claimed in claim 3, wherein when the cell phone wants to perform the near-end payment process, the SDC lowers the voltage of the second input/output pin to a low level to turn off the third transistor and to decouple the second power supply voltage of the SDC from the power receive pin of the smart card; when the cell phone wants to perform the far-end payment process, the SDC pulls the voltage of the second input/output pin to a high level to turn on the third transistor and to couple the second power supply voltage of the SDC to the power receive pin of the smart card.

5. The secure digital card as claimed in claim 2, wherein when the cell phone wants to perform the near-end payment process, the SDC lowers the voltage of the first input/output pin to a low level to turn on the first transistor and the second transistor and to couple the first power supply pin of the NFC controller to the power receive pin of the smart card; when the cell phone wants to perform the far-end payment process, the SDC pulls the voltage of the first input/output pin to a high voltage to turn off the first transistor and the second transistor and to decouple the first power supply pin of the NFC controller from the power receive pin of the smart card.

6. The secure digital card as claimed in claim 1, wherein when the cell phone wants to perform the near-end payment process, the NFC controller completes a financial transaction between the cell phone and a point of sale (POS) according to a near field communication (NFC) protocol, and completes a data exchange between the cell phone and the smart card via the single wire protocol interface.

7. The secure digital card as claimed in claim 1, wherein when the cell phone wants to perform the far-end payment process, data exchange between the cell phone and the SDC is completed according to a CupMobile protocol, and data exchange between the SDC and the smart card is completed via the ISO-7816 interface.

8. The secure digital card as claimed in claim 1, wherein the near-end payment process is a predetermined process under a background situation, before the cell phone performs the far-end payment process, the cell phone sends a connection command to the SDC via the SDIO interface to make the SDC execute the far-end payment process. After the far-end payment process is completed, the cell phone sends a disconnection command to the SDC via the SDIO interface.

9. The secure digital card as claimed in claim 1, wherein the secure digital card further comprises a flash memory, coupled to the SDC, storing data for the SDC.

10. A secure digital card, coupled to a cell phone, comprising:
   a smart card, coupled to a near field communication (NFC) controller via a single wire protocol (SWC) interface, comprising a power receive pin;
   a secure digital card controller (SDC), coupled to the cell phone via a standard input output (SDIO) interface, and coupled to the smart card via an ISO-7816 interface;
   a first transistor, coupled between a first node and the power receive pin of the smart card, having a gate coupled to a second node;
   a second transistor, coupled between the first node and a first power supply pin of the NFC controller, having a gate coupled to the second node, wherein the direction of the parasitic diode of the first transistor is inverse to that of the parasitic diode of the second transistor;
   a first diode, coupled between the second node and a first input/output pin of the SDC; and
   a resistor, coupled between the first power supply pin of the NFC controller and the second node.

11. The secure digital card as claimed in claim 10, wherein the second power control circuit comprises:
   a third transistor, coupled between a second power supply pin of the SDC and a third node, having a gate coupled to a second input/output pin of the SDC;
   a second diode, coupled between the third node and the power receive pin of the smart card;
   wherein the direction of the second diode is inverse to that of the parasitic diode of the third transistor.

12. The secure digital card as claimed in claim 11, wherein when the cell phone wants to perform a near-end payment process, the SDC turns on the first transistor and the second transistor to supply a first voltage generated by the first power supply pin of the NFC controller to the power receive pin of the smart card; and when the cell phone wants to perform a far-end payment process, the SDC turns on the third transistor to supply a second voltage generated by the second power supply pin of the SDC to the power receive pin of the smart card.

13. The secure digital card as claimed in claim 12, wherein when the cell phone wants to perform the near-end payment process, the SDC lowers the voltage of the first input/output pin to a low level to turn on the first transistor and the second transistor and to couple the first power supply pin of the NFC controller to the power receive pin of the smart card; when the cell phone wants to perform the far-end payment process, the SDC pulls the voltage of the first input/output pin to a high voltage to turn off the first transistor and the second transistor and to decouple the first power supply pin of the NFC controller from the power receive pin of the smart card.

14. The secure digital card as claimed in claim 12, wherein when the cell phone wants to perform the near-end payment process, the SDC lowers the voltage of the second input/output pin to a low level to turn off the third transistor and to decouple the second power supply voltage of the SDC from the power receive pin of the smart card; when the cell phone wants to perform the far-end payment process, the SDC pulls the voltage of the second input/output pin to a high level to turn on the third transistor and to couple the second power supply voltage of the SDC to the power receive pin of the smart card.

15. The secure digital card as claimed in claim 12, wherein when the cell phone wants to perform the near-end payment process, the NFC controller completes a financial transaction between the cell phone and a point of sale (POS) according to a near field communication (NFC) protocol, and completes a data exchange between the cell phone and the smart card via the single wire protocol interface.

16. The secure digital card as claimed in claim 12, wherein when the cell phone wants to perform the far-end payment process, a data exchange between the cell phone and the SDC is completed according to a CupMobile protocol, and a data exchange between the SDC and the smart card is completed via the ISO-7816 interface.

17. The secure digital card as claimed in claim 12, wherein the near-end payment process is a predetermined process under a background situation, before the cell phone performs the far-end payment process, the cell phone sends a connection command to the SDC via the SDIO interface to make the SDC execute the far-end payment process; after the far-end payment process is completed, the cell phone sends a disconnection command to the SDC via the SDIO interface.

18. The secure digital card as claimed in claim 10, wherein the secure digital card further comprises a flash memory, coupled to the SDC, storing data for the SDC.

* * * * *